(12) United States Patent
Han

(10) Patent No.: US 11,967,259 B2
(45) Date of Patent: Apr. 23, 2024

(54) METHOD OF MANUFACTURING A DISPLAY PANEL AND METHOD OF DETECTING THE DISPLAY PANEL

(71) Applicant: HKC CORPORATION LIMITED, Guangdong (CN)

(72) Inventor: Jiankun Han, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 168 days.

(21) Appl. No.: 17/265,100

(22) PCT Filed: Dec. 7, 2018

(86) PCT No.: PCT/CN2018/119705
§ 371 (c)(1),
(2) Date: Feb. 1, 2021

(87) PCT Pub. No.: WO2020/098023
PCT Pub. Date: May 22, 2020

(65) Prior Publication Data
US 2021/0312843 A1  Oct. 7, 2021

(30) Foreign Application Priority Data
Nov. 14, 2018  (CN) .......................... 201811351378.0

(51) Int. Cl.
*G09G 3/00* (2006.01)
*G02F 1/1362* (2006.01)
*G09G 3/36* (2006.01)

(52) U.S. Cl.
CPC ....... *G09G 3/006* (2013.01); *G02F 1/136295* (2021.01); *G09G 3/3677* (2013.01); *G09G 2330/12* (2013.01)

(58) Field of Classification Search
None
See application file for complete search history.

(56) References Cited

U.S. PATENT DOCUMENTS 5,883,437 A * 3/1999 Maruyama ............ H01L 21/485
257/773
6,310,667 B1 * 10/2001 Nakayoshi ........ G02F 1/136204
257/E27.111
(Continued)

FOREIGN PATENT DOCUMENTS

CN  1700026 A  11/2005
CN  101145565 A  3/2008
(Continued)

OTHER PUBLICATIONS

PCT International Search Report; Application No. PCT/CN2018/121785; dated Aug. 14, 2019; 6 pages.
(Continued)

*Primary Examiner* — Patrick N Edouard
*Assistant Examiner* — Peijie Shen
(74) *Attorney, Agent, or Firm* — Conley Rose, P.C.; Grant Rodolph

(57) ABSTRACT

A method of manufacturing a display panel comprises a first substrate is manufactured, a plurality of scanning lines and shorting bars are formed on the first base substrate, the scanning lines are located in the first display area and extend to the first peripheral wiring area, and the shorting bars are located in the first cutting area, a shorting bar is connected to one end of a plurality of odd-numbered scanning lines, or a shorting bar is connected to one end of a plurality of even-numbered scanning lines, to make the odd-numbered scanning lines each in an electrical connection with at least another odd-numbered scanning line, or the even-numbered scanning lines each in an electrical connection with at least another even-numbered scanning line.

15 Claims, 8 Drawing Sheets

(56) References Cited

U.S. PATENT DOCUMENTS

| | | | | |
|---|---|---|---|---|
| 6,400,425 | B1* | 6/2002 | Kim | G02F 1/136286 349/40 |
| 6,437,596 | B1* | 8/2002 | Jenkins | G09G 3/006 324/760.02 |
| 6,624,857 | B1* | 9/2003 | Nagata | G02F 1/136259 349/139 |
| 6,654,074 | B1* | 11/2003 | Ha | G02F 1/1309 349/40 |
| 2002/0027621 | A1* | 3/2002 | Chae | G02F 1/13458 349/40 |
| 2002/0044228 | A1* | 4/2002 | Oh | G02F 1/136204 349/40 |
| 2002/0085169 | A1* | 7/2002 | Choi | G02F 1/1309 349/192 |
| 2002/0089614 | A1* | 7/2002 | Kim | G02F 1/1309 349/40 |
| 2003/0117165 | A1 | 6/2003 | Kim | |
| 2004/0126915 | A1* | 7/2004 | Chae | G02F 1/1309 438/30 |
| 2005/0099583 | A1* | 5/2005 | Moriyama | G02F 1/133351 349/187 |
| 2006/0033857 | A1* | 2/2006 | Kim | G02F 1/136259 349/54 |
| 2006/0284257 | A1* | 12/2006 | Kwak | H01L 22/34 257/355 |
| 2007/0040983 | A1* | 2/2007 | Ishii | G02F 1/1345 349/152 |
| 2007/0194348 | A1* | 8/2007 | Yang | H01L 27/12 257/E27.111 |
| 2007/0195255 | A1* | 8/2007 | Cho | G02F 1/1339 349/153 |
| 2007/0296899 | A1* | 12/2007 | Murade | G02F 1/1339 349/139 |
| 2008/0123013 | A1* | 5/2008 | Kim | G02F 1/136286 349/54 |
| 2008/0265250 | A1* | 10/2008 | Huang | G09G 3/006 257/E23.002 |
| 2008/0265253 | A1* | 10/2008 | Tian | G02F 1/1345 257/E21.535 |
| 2009/0121328 | A1* | 5/2009 | Hsu | G02F 1/13452 257/E23.06 |
| 2011/0057680 | A1* | 3/2011 | Wang | G09G 3/006 324/760.01 |
| 2013/0134986 | A1* | 5/2013 | Yun | G09G 3/006 324/543 |
| 2015/0077681 | A1* | 3/2015 | Li | G09G 3/006 349/47 |
| 2015/0145549 | A1* | 5/2015 | Wen | G02F 1/13452 324/760.01 |
| 2015/0241501 | A1* | 8/2015 | Jang | G09G 3/006 324/527 |
| 2015/0325158 | A1* | 11/2015 | Shao | G09G 3/006 324/750.3 |
| 2015/0332979 | A1* | 11/2015 | Yang | H01L 22/14 438/17 |
| 2016/0189580 | A1* | 6/2016 | Wang | G09G 3/006 345/215 |
| 2016/0247428 | A1* | 8/2016 | Wang | G09G 3/36 |
| 2016/0342050 | A1* | 11/2016 | Wang | G01R 31/50 |
| 2016/0372062 | A1* | 12/2016 | Nakayama | G02F 1/133 |
| 2017/0219856 | A1* | 8/2017 | Fu | G02F 1/1303 |
| 2017/0256188 | A1* | 9/2017 | Chang | G09G 3/006 |
| 2018/0061291 | A1* | 3/2018 | Ren | G01R 31/2815 |
| 2018/0294282 | A1* | 10/2018 | Wang | H01L 27/1262 |
| 2021/0210482 | A1* | 7/2021 | Zhang | H01L 27/1244 |
| 2021/0280115 | A1* | 9/2021 | Wu | G02F 1/1362 |
| 2021/0373378 | A1* | 12/2021 | Wu | G02F 1/13629 |

FOREIGN PATENT DOCUMENTS

| | | |
|---|---|---|
| CN | 101661200 A | 3/2010 |
| CN | 102681224 A | 9/2012 |
| CN | 102830520 A | 12/2012 |
| CN | 103137049 A | 6/2013 |
| CN | 1825176 A | 4/2015 |
| CN | 104503176 A | 4/2015 |
| CN | 104680957 A | 6/2015 |
| CN | 104914640 A | 9/2015 |
| CN | 106940494 A | 7/2017 |
| CN | 107015387 A | 8/2017 |
| CN | 107463015 A | 12/2017 |
| JP | 2010032723 A | 2/2010 |

OTHER PUBLICATIONS

PCT Written Opinion of the International Searching Authority; Application No. PCT/CN2018/121785; dated Aug. 14, 2019; 3 pages.

* cited by examiner

METHOD OF MANUFACTURING A DISPLAY PANEL AND METHOD OF DETECTING THE DISPLAY PANEL

CROSS-REFERENCE TO RELATED APPLICATIONS

This application is a National Stage of International Patent Application No. PCT/CN2018/119705 filed on Dec. 7, 2018, which claims priority to Chinese Patent Application No. 201811351378.0 filed on Nov. 14, 2018, both of which are hereby incorporated herein by reference as if reproduced in their entirety.

TECHNICAL FIELD

This application relates to the field of display technology, and in particular to a method of manufacturing a display panel and a method of detecting the display panel.

BACKGROUND

The statements here only provide background information related to this application, and do not necessarily constitute prior art. A Liquid Crystal Display (LCD) panel is an important part of the liquid crystal display, which usually comprises a color filter substrate (CF substrate) and a thin film transistor (TFT) array substrate which are oppositely arranged, and a liquid crystal layer disposed between the two substrates. The array substrate is provided with scanning lines and data lines that cross each other to define multiple pixel units. TFT is turned on or off according to the signal of the scanning line to transmit the signal of the data line to the pixel unit. The liquid crystal molecules of the liquid crystal layer will rotate according to different data of voltage signal to transmit or shield light. The light provided by the backlight module is refracted to form an image corresponding to the data signal. HSD (Half Source Double Gate) design is to double the number of Gate IC (Integrated Circuit) and scanning lines, and to reduce the number of source IC and data lines by half, that is, one row of sub-pixels is connected to two adjacent scanning lines, and a data line is connected to the left and right columns of sub-pixels simultaneously. Due to the lower cost of Gate IC, this design is cost-effective and achieves the purpose of reducing costs. However, this design also brings troubles to the array test. A non-contact array test involves adding a signal to one end of a scanning line, receiving the signal at the other end, and detecting whether the scanning line is circuit-opening with the change of the signal. However, because the distance of the two scanning lines between two adjacent rows of sub-pixels is too close, when the second scanning line is circuit-opening, a capacitance effect is formed between the second scanning line and the third scanning line. The voltage signal at the other end of the scanning line cannot be detected abnormally, such that the open-circuit defect of the second scanning line cannot be detected accurately.

SUMMARY

One objective of the present application is to provide a method of manufacturing a display panel, comprising but not limited to improving the accuracy of open-circuit detection of scanning lines in a half source double gate design.

The technical solution used in the embodiment of the present application is a method of manufacturing a display panel that comprises: manufacturing a first substrate which comprises providing a first base substrate, the first base substrate comprising a plurality of first active areas arranged at intervals, and a first cutting area arranged around the first active area, each of the first active areas comprising a first display area and a first peripheral wiring area provided on the periphery of the first display area; forming a plurality of parallel and spaced scanning lines and shorting bars on the first base substrate, wherein the scanning lines are located in the first display area and extend to the first peripheral wiring area; the shorting bars are located in the first cutting area, and connect to the odd-numbered scanning lines to make the odd-numbered scanning lines each in short-circuit with at least another odd-numbered scanning line; or the shorting bars are respectively connected to the even-numbered scanning lines to make the even-numbered scanning lines each in short-circuit with at least another even-numbered scanning line; performing an open-circuit detection on each of the scanning lines; cutting off the area between the shorting bars and the scanning lines and performing short-circuit detection on the scanning lines; and forming an insulating layer and a second metal layer on the scanning lines, wherein the second metal layer comprises a plurality of parallel and spaced data lines, and performing open-circuit detection and a short-circuit detection on the data lines.

Another object of the present application is to provide a method of manufacturing a display panel, comprising manufacturing a first substrate, wherein the step of manufacturing the first substrate comprises: providing a first base substrate, the first base substrate comprising a plurality of first active areas arranged at intervals, and a first cutting area arranged around the first active area, wherein each of the first active areas comprise a first display area and a first peripheral wiring area provided on the periphery of the first display area; depositing a first metal material layer on the first base substrate, and patterning the first metal material layer and meanwhile forming a plurality of parallel and spaced scanning lines and shorting bars through a photo masking process; the scanning lines are located in the first display area and extend to the first peripheral wiring area; the shorting bar is located in the first cutting area, and the shorting bar is connected to the odd-numbered scanning lines to make the odd-numbered scanning lines each in short-circuit with at least another odd-numbered scanning line, or the shorting bar is connected to the even-numbered scanning lines to make the even-numbered scanning lines each in short-circuit with at least another even-numbered scanning line; the thickness of the first metal material layer is 2000-5500 angstroms; performing an open-circuit detection on each of the scanning lines by non-contact detection; cutting off the area between the shorting bars and the scanning lines, and performing a short-circuit detection on each of the scanning lines; and forming an insulating layer on the scanning line, depositing a second metal material layer on the insulating layer, and patterning the second metal material layer to form a plurality of parallel and spaced data lines; and performing an open-circuit detection and a short-circuit detection on the data lines.

A further object of the present application is to provide a method of detecting a display panel used to detect open-circuit defect and short-circuit defect of scanning lines on an array substrate, the method comprising: electrically connecting a plurality of odd-numbered scanning lines to make each of the odd-numbered scanning lines in short-circuit with at least another odd-numbered scanning line; or alternatively connecting a plurality of even-numbered scanning lines to make each of the even-numbered scanning lines in short-circuit with at least another even-numbered scanning line; performing an open-circuit detection on each of the scanning lines; disconnecting the electrical connection between a plurality of even-numbered scanning lines or the electrical connection between a plurality of odd-numbered scanning lines, and performing a short-circuit detection on each of the scanning lines.

A method of manufacturing the display panel provided by the embodiment of the present application is to form a shorting bar connecting a plurality of odd-numbered scanning lines or a plurality of even-numbered scanning lines at one end of the scanning lines at the same time as the scanning line of the first substrate is made, so that an electrical connection is formed between the spaced scanning lines. When a detection signal is applied to one end of each of scanning lines and detected at the other end thereof for open-circuit detection, there will be no capacitance effect between two adjacent scanning lines. Especially for design, even if the distance between two adjacent scanning lines is small, it will not interfere with the open-circuit detection of the scanning lines, which improves the detection yield of the scanning lines on the first substrate of the display panel and the manufacturing yield of the display panel to avoid the waste of time and cost caused by later rework. A method of manufacturing a display panel and a method of detecting the display panel can avoid the formation of a capacitance effect between two adjacent scanning lines, and improve the accuracy of the open-circuit detection of the scanning lines.

BRIEF DESCRIPTION OF THE DRAWINGS

In order to more clearly illustrate the technical solutions in the embodiments of the present application, the following will briefly introduce the accompanying drawings that need to be used in the description of the embodiments or the prior art. Obviously, the accompanying drawings in the following description are only some embodiments of the present application. Those skilled in the art can obtain other drawings based on these drawings without creative work.

DETAILED DESCRIPTION OF THE EMBODIMENTS

Figure 1:
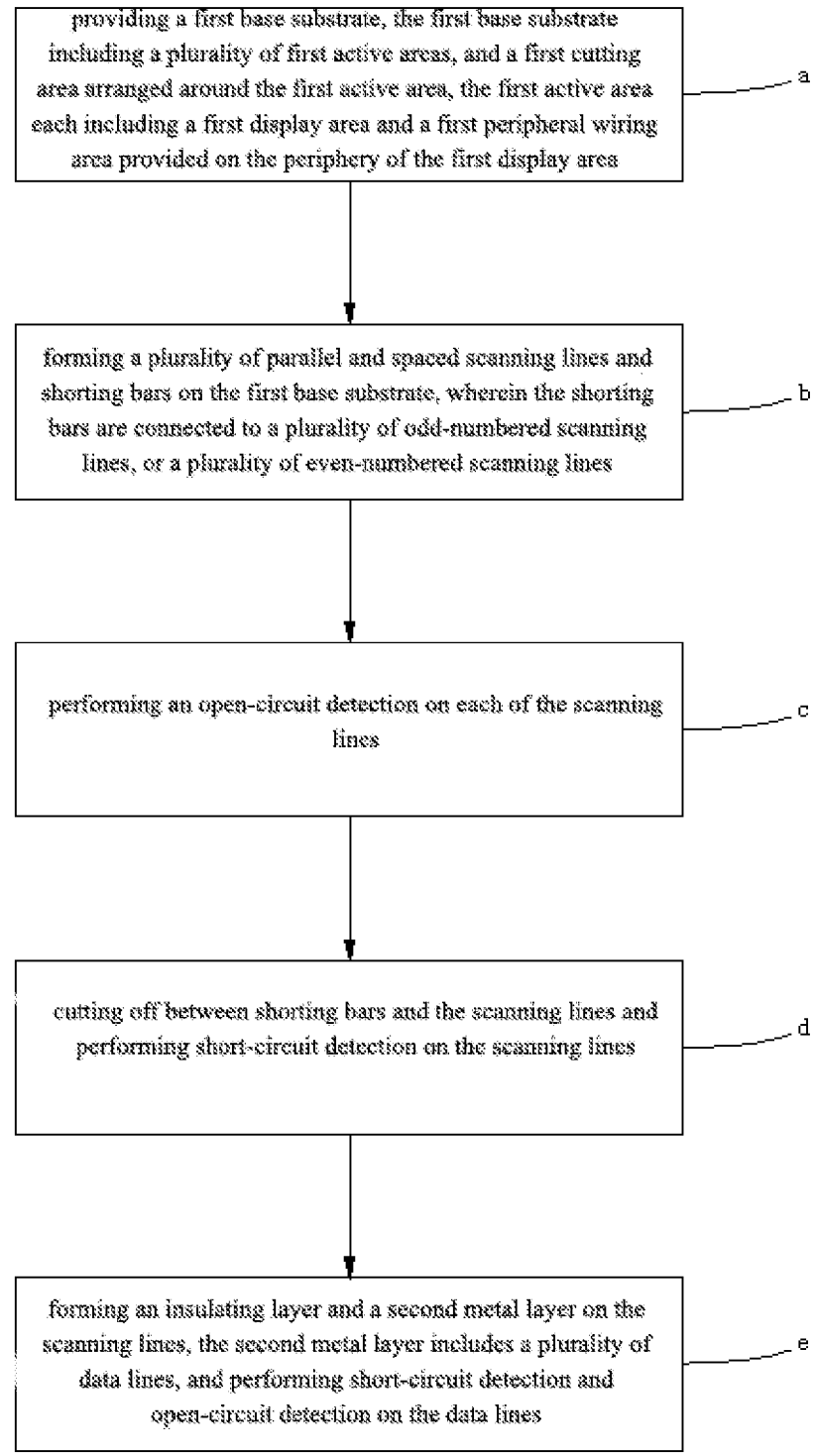
FIG. 1 is a flowchart to manufacture an array substrate in a method of manufacturing the display panel provided by an embodiment of the present application.

In order to make the purpose, technical solutions, and advantages of this application clearer, the following will further describe this application in detail in conjunction with the drawings and embodiments. It should be understood that the embodiments described herein are only used to explain the application, and not used to limit the application.

It should be noted that when a component is referred to as being "fixed to" or "arranged on" another component, it can be directly on the other component or indirectly above the other component. When a component is referred to as being "connected" to another component, it can be directly or indirectly connected to the other component. The terms "upper", "lower", "left", "right", etc. indicate the orientation or positional relationship based on the orientation or positional relationship shown in the drawings, and are only for ease of description, and do not indicate or imply the device or the element referred to must have an orientation, is constructed and operated in an orientation, and therefore cannot be understood as a limitation of the patent. For those skilled in the art, the meaning of the above terms can be understood according to conditions. The terms "first" and "second" are only used for ease of description, and cannot be understood as indicating or implying relative importance or implicitly indicating the number of technical features. "a plurality of" means two or more than two, unless otherwise defined.

In order to illustrate the technical solutions of the present application, detailed descriptions are given below in conjunction with drawings and embodiments.

Figure 2:
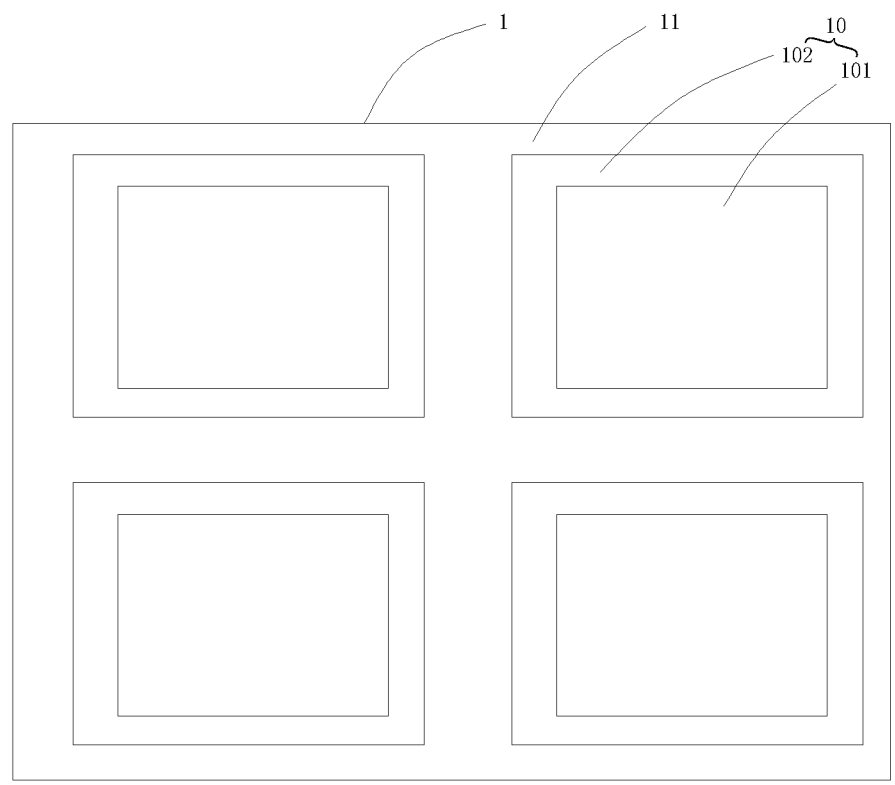
FIG. 2 is a schematic diagram of step a to manufacture an array substrate in a method of manufacturing the display panel provided by an embodiment of the present application.

Please refer to FIG. 1 to FIG. 6 for a method of manufacturing a display panel provided by the present application. A method of manufacturing the display panel of this embodiment comprises manufacturing a first substrate and a second substrate opposite to the first substrate. In an embodiment, the first substrate is an array substrate. Specifically, the method of manufacturing the array substrate comprises:

Step a, as shown in FIG. 2, wherein a first base substrate 1 is provided, the first base substrate 1 comprising a plurality of first active areas 10 arranged at intervals, and a first cutting area 11 arranged around the first active area 10, wherein each of the active area comprises a first display area 101 and a first peripheral wiring area 102 provided on the periphery of the first display area.

The first base substrate 1 is a transparent substrate, such as a glass substrate, a transparent plastic substrate, etc. Each of the first active area 10 is used to form an array substrate 100 (refer to FIG. 5 and FIG. 6), wherein the first display area 101 is used to form pixel units to display images, and the first peripheral wiring area 102 is used to form wiring to provide signals to the pixel units in the first display area 101 and used to provide the arrangement space of chips or circuit boards. The array substrate 100 is used to form the display panel 900, and the first cutting area 11 is located between the two first active areas 10, that is, between the two display panels 900, and it will be cut and removed subsequently.

Figure 3:
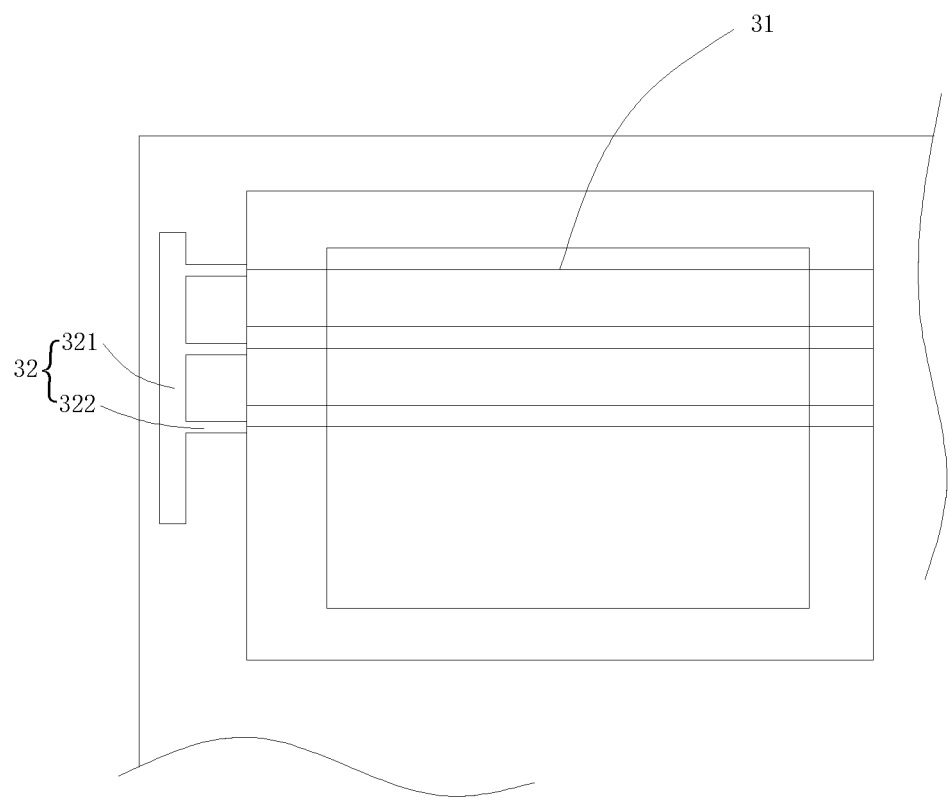
FIG. 3 is a schematic diagram of step b to manufacture an array substrate in a method of manufacturing the display panel provided by the embodiment of the present application.

Step b, as shown in FIG. 3, wherein a plurality of parallel and spaced scanning lines 31 and shorting bars 32 are formed on the first base substrate 1. The scanning lines 31 are located in the first display area 101 and extend to the first peripheral wiring area 102. The shorting bar 32 is located in the first cutting area 11, and the shorting bar 32 is connected to a plurality of odd-numbered scanning lines 31 to form shorting between a plurality of odd-numbered scanning lines 31, or the shorting bar 32 is connected to a plurality of even-numbered scanning lines 31 to form shorting between a plurality of even-numbered scanning lines 31.

A first metal material layer is deposited on the first base substrate 1 by sputtering coating or the like, a photoresist layer is formed on the first metal material layer, and the photoresist layer is exposed to light by a mask. The mask has a carved pattern area corresponding to a plurality of scanning lines 31 and a shorting bar 32. The photoresist layer is exposed to ultraviolet light through the carved pattern area. After development, the area on the photoresist layer corresponding to scanning lines 31 and shorting bar 32 is left and other areas are removed. Then, the first metal material layer is wet-etched using the pattern of the photoresist layer as a mask to obtain a plurality of scanning lines 31 located in the first active area 10 and shorting bar 32 located in the first cutting area 11 simultaneously. The shorting bar is connected to a plurality of odd-numbered scanning lines 31 or a plurality of even-numbered scanning lines 31.

The patterning of the first metal material layer also simultaneously forms a plurality of gates 51 (not shown in FIG. 3, see FIG. 6) in the first display area 101, and the gates 51 are connected to the scanning lines 31.

The first metal material layer can be chromium (Cr), molybdenum (Mo), copper (Cu), titanium (Ti), molybdenum/aluminum (Mo/Al) composite layer or molybdenum/aluminum/molybdenum (Mo/Al/Mo) composite layer, etc. The thickness of the first metal material layer is 2000-8000 angstroms, optionally 2000-5500 angstroms.

In FIG. 3, a shorting bar 32 is formed in the first cutting area 11 on one side of the first active area 10. The shorting bar 32 comprises a shorting part 321 and a connection part 322 arranged perpendicular to the scanning line 31. One end of the connection part 322 is connected to the shorting part 321, and the other end is connected to an odd-numbered scanning line 31 or an even-numbered scanning line 31, that is, the connection part 322 is connected to the odd-numbered scanning lines 32 one-to-one and correspondingly, or is connected to the even-numbered scanning lines 31 one-to-one and correspondingly. The shorting part 321 connects the connection parts 322 to form shorting between the odd-numbered scanning lines 31 or the even-numbered scanning lines 31.

Each of the first active areas 10 can correspond to one or more shorting bars 32. Moreover, there is no electrical connection relationship between the shorting bars 32 corresponding to each of the first active area 10 and the shorting bars 32 corresponding to other first active areas 10. When a plurality of shorting bars 32 are provided correspondingly to a first active area 10, there may or may not be an electrical connection relationship between a plurality of shorting bars 32. The following description takes a first active area 10 as an example to illustrate shorting bars 32.

In an embodiment, the number of the shorting parts 321 is one, and the one shorting part 321 is simultaneously connected to all the odd-numbered scanning lines 31 or all the even-numbered scanning lines 31 in the first active area 10 through a plurality of connection parts 322.

In one embodiment, the number of shorting parts 321 is multiple, and each shorting part 321 is connected to at least two even-numbered scanning lines 31 or at least two odd-numbered scanning lines 31 through multiple connection parts 322. For example, a shorting part 321 is connected to the first, third, fifth, and seventh scanning lines 31 through four connection parts 322, that is, one shorting bar 32 can be connected to the four odd-numbered scanning lines 31, and similarly, another shorting bar 32 can be connected to the ninth, eleventh, thirteenth, fifteenth scanning lines 31 . . . . In this way, each of the odd-numbered scanning lines 31 is connected to at least another odd-numbered scanning line 31, or each of the even-numbered scanning lines 31 is connected to at least another even-numbered scanning line 31.

Of course, the connection between the shorting bar 32 and the scanning line 31 is not limited to being connected in an odd-numbered order or in an even-numbered order, and other connection methods may also be used. For example, one shorting bar 32 is connected to the fourth and sixth scanning lines 31, and another shorting bar 32 is connected to the second and eighth scanning lines 31.

The connection part 322 may extend in parallel from the scanning line 31 so as to be perpendicular to the shorting part 321. Of course, the connection part 322 and the scanning line 31 may also be connected obliquely. This application does not restrict this.

Step c: an open-circuit detection is performed on each of scanning lines 31.

A non-contact detection is used for the open-circuit detection of the scanning line. A 200 KHz alternating current voltage is applied at a position about 150 μm above one end of the scanning line 31. Capacitance is formed between the position applying electricity and the scanning line, which can transmit the signal of alternating current voltage to the scanning line, and finally detected by the receiving sensor at the other end of the scanning line 31. Capacitance is also formed between the receiving sensor and the scanning line 31. Since the electrical signal is very small and is an alternating current signal, an amplifier can be used to amplify and filter the alternating current signal of the receiving sensor, and convert the alternating current signal into a direct current signal for detection.

Since a scanning line 31 is connected to the spaced scanning lines 31 through shorting bar 32, when signal is applied to one end of each of scanning lines 31 and detected at the other end thereof, even if the distance between the scanning line 31 and the adjacent scanning line 31 is too small, no capacitance effect will be formed, and no interference will be caused to signal detection. If the scanning line 31 has an open-circuit defect, the abnormality of the signal can be detected, so that the open-circuit defect of the scanning line 31 can be detected accurately, which improves the detection yield and manufacturing yield of the array substrate to avoid rework caused by the detection of poor display after the completion of subsequent array substrate fabrication or alignment.

Figure 4:
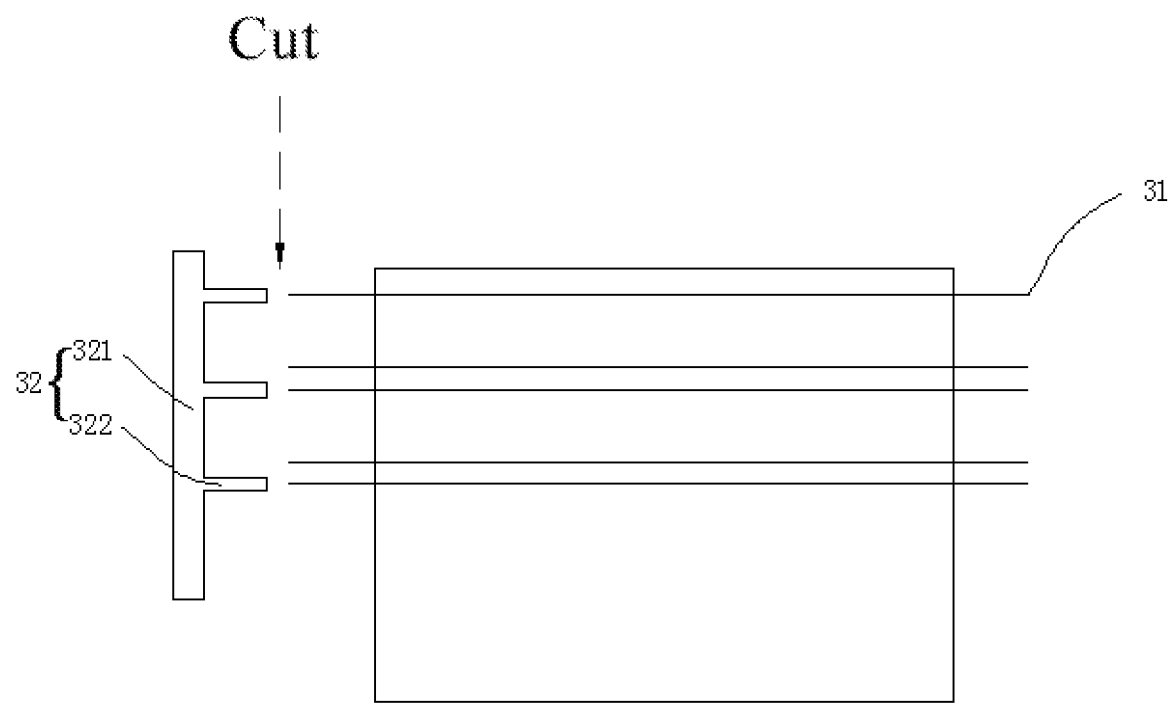
FIG. 4 is a schematic diagram of step d to manufacture an array substrate in a method of manufacturing the display panel provided by the embodiment of the present application.

Step d, as shown in FIG. 4, wherein the electrical connection between the shorting bar 32 and the scanning line 31 is disconnected, and a short-circuit detection is performed on each of scanning lines 31.

As shown in FIG. 4, the scanning line 31 is cut off from the connection part 322 by laser cutting along the outer edge of the first peripheral wiring area 102, that is, between the first peripheral wiring area 102 and the first cutting area 11 to make each of the scanning lines 31 separate and no longer be electrically connected. At this time, a short-circuit detection is performed on each of the scanning lines 31.

In other embodiments, both ends of the scanning line 31 can be cut in the first peripheral wiring area 102, and the cut scanning line 31 extends from the first display area 101 to the place close to the outer edge in the first peripheral wiring area 102.

Figure 5:
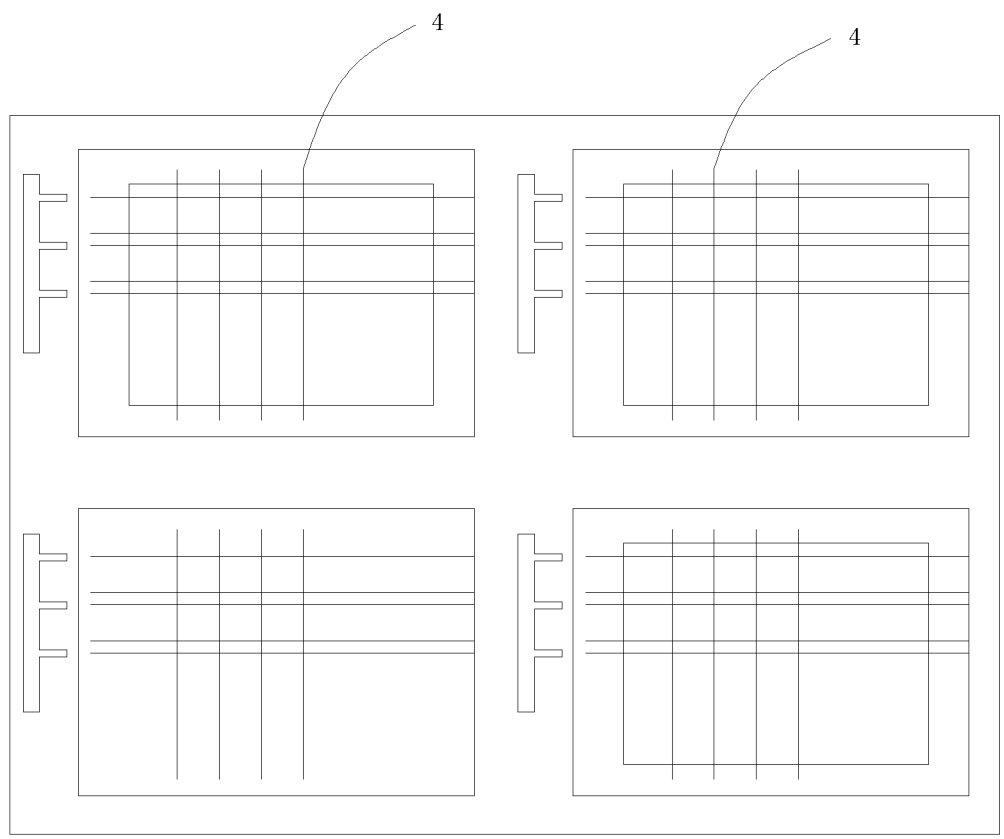
FIGS. 5 and 6 are schematic diagrams of steps e and f to manufacture an array substrate in a method of manufacturing the display panel provided by the embodiment of the present application.
Figure 6:
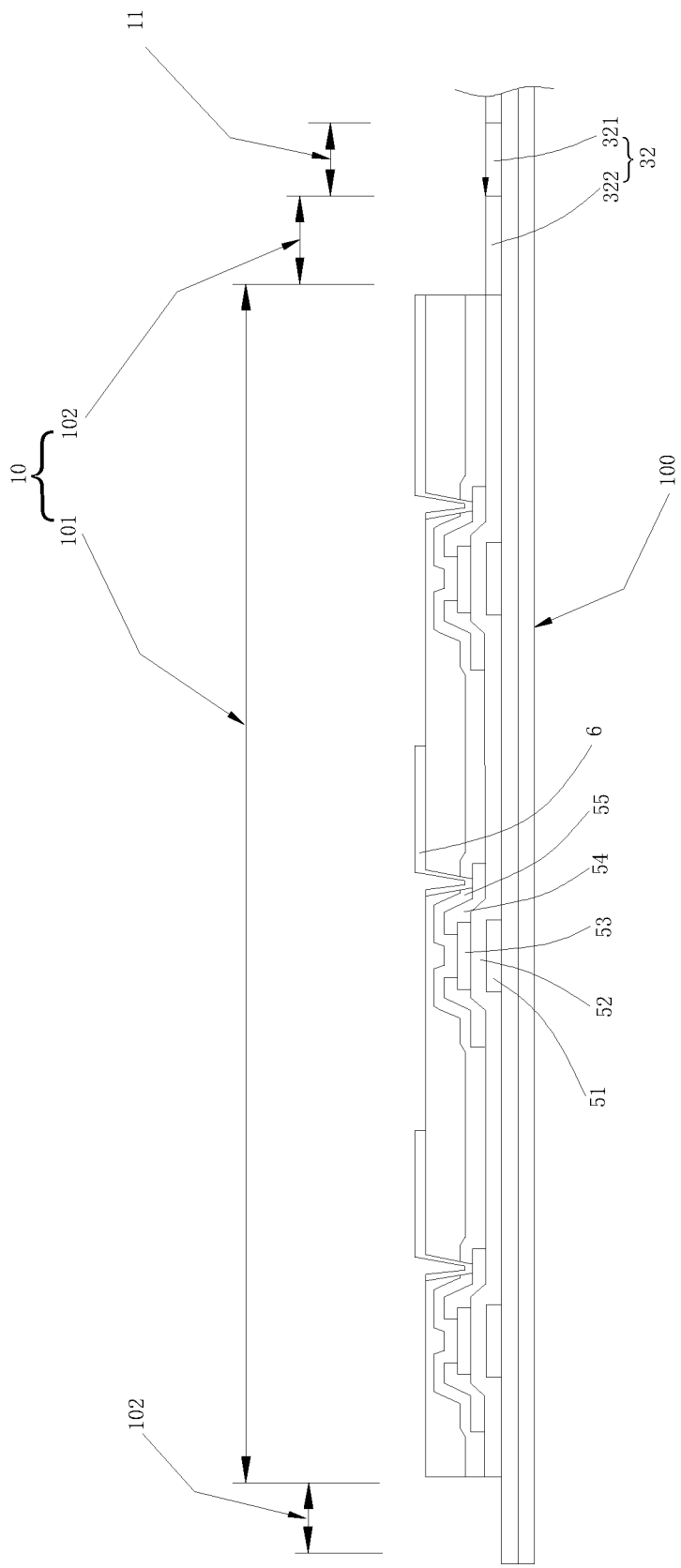

Step e, as shown in FIGS. 5 and 6, wherein in the first active area 10, a gate insulating layer 52, an active layer 53, and a source/drain metal layer 54 are formed on the scanning line 31, and the source/drain metal layer 54 comprises a source/drain and a plurality of parallel and spaced data lines 4 connected to the source. An open-circuit detection and a short-circuit detection are performed on the data lines 4 respectively.

In this step e, the gate insulating layer 52 is formed by chemical vapor deposition, and the material of the gate insulating layer 52 is at least one of silicon oxide (SiOx) and silicon nitride (SiNx). The thickness of the gate insulating layer 52 is 1000-3000 angstroms.

An amorphous silicon layer is deposited by a chemical vapor deposition method, and after exposure, development and etching processes, the active layer 53 in the first display area 101 is obtained. The active layer 53 comprises a channel region and ohmic contact layers connected to both sides of the channel region.

A second metal material layer is deposited on the active layer 53 by sputtering coating, and the second metal material layer is patterned by exposure, development and etching processes to obtain the source/drain in the first display area 101 and a plurality of data lines 4 connected to the source and extending from the first display area 101 to the first peripheral wiring area 102. The second metal material layer can be chromium (Cr), molybdenum (Mo), copper (Cu), titanium (Ti), molybdenum/aluminum (Mo/Al) composite layer or molybdenum/aluminum/molybdenum (Mo/Al/Mo) composite layers, etc. The thickness of the second metal material layer is 2000-8000 angstroms, 2000-5500 angstroms.

Step f, as shown in FIG. 6, wherein in the first active area 10, a passivation layer 55 is formed on the source/drain metal layer, a transparent conductive layer is formed on the passivation layer 55, and the transparent conductive layer is patterned to obtain a plurality of pixel electrodes 6; and an array substrate 100 is obtained in each of the first active area 10.

A thin film transistor is formed by the gate 51, the gate insulating layer 52, the active layer 53, and the source/drain. Each thin film transistor is connected to a pixel electrode 6 to form a sub-pixel. As shown in FIG. 5, one row of sub-pixels is driven by two adjacent scanning lines 31, and two adjacent columns of sub-pixels are simultaneously connected to one data line 4 and driven by one data, which becomes an HSD design. The distance between the two scanning lines 31 and between the two rows of sub-pixels is relatively small, and because in steps 2 and 3 of this embodiment, a plurality of odd-numbered scanning lines 31 are connected or a plurality of even-numbered scanning lines 31 are connected through shorting bar 32, the open-circuit defect of each of the scanning lines 31 can be detected accurately.

Figure 7:
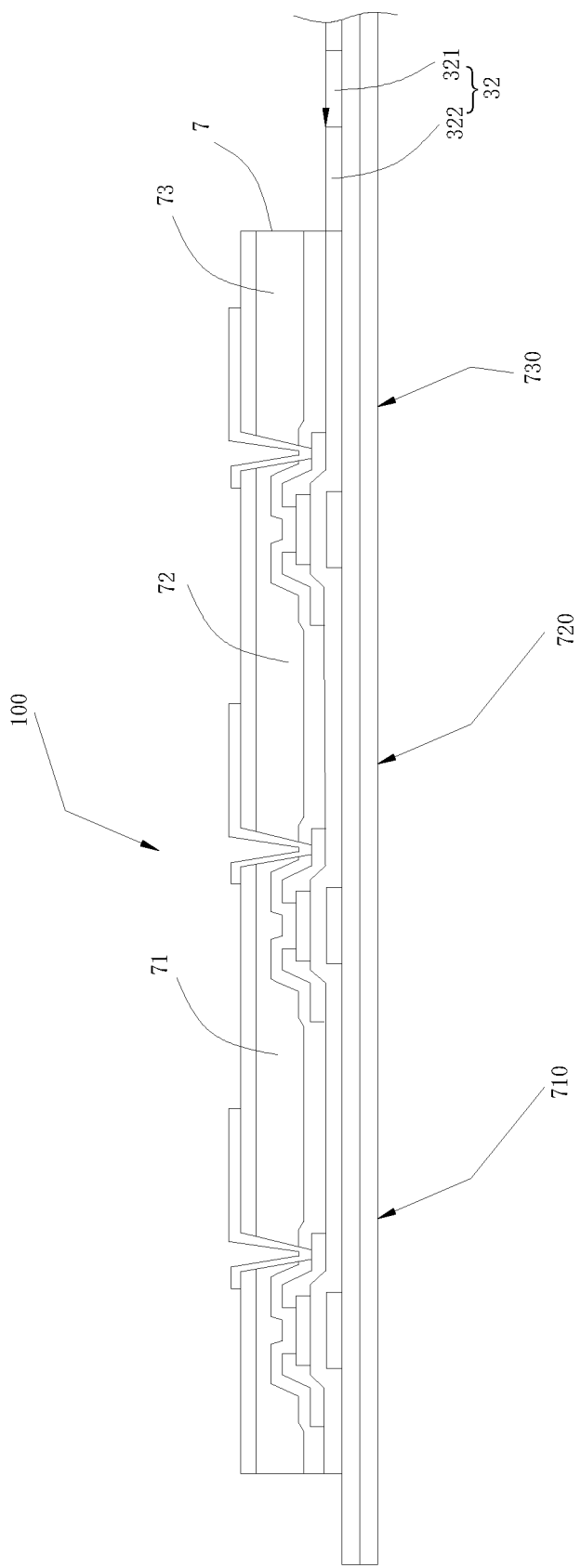
FIG. 7 is a schematic diagram of step f' to manufacture an array substrate in a method of manufacturing the display panel provided by the embodiment of the present application.

In one embodiment, the manufacture of the array substrate in the method of manufacturing the display panel provided by the present application can manufacture a COA (Color on Array) type array substrate. Steps a-e are the same as the first embodiment, which is no longer described herein, and the difference is: As shown in FIG. 7, step f: in the first active area 10, a passivation layer 55 is formed on the source/drain metal layer, a color resistance layer 7 is formed on the passivation layer 55, and a flat layer is formed on the color resistance layer 7, a transparent conductive layer is formed on the flat layer, and the transparent conductive layer is patterned to obtain a plurality of pixel electrodes 6. The pixel electrodes 6 are connected to the drain through holes on the flat layer and the color resistance layer 7, and an array substrate 100 is obtained in each of the first active area 10.

The step to form the color resistance layer 7 comprises: a red color resistance layer is deposited on the passivation layer 55 and patterned to obtain a red color resistance block 71 which is corresponding to a pixel electrode 6 to obtain a red sub-pixel 710; a green color resistance layer is deposited on the red color resistance block 71 and the passivation layer 55 and patterned to obtain a green color resistance block 72 which is corresponding to a pixel electrode 6 to obtain a green color resistance block 72; a blue color resistance layer is deposited on the red color resistance block 71, the green color resistance block 72 and the passivation layer 55 and patterned to obtain a blue color resistance block 73 which is corresponding to a pixel electrode 6 to obtain a blue sub-pixel 730, as shown in FIG. 7.

Figure 8:
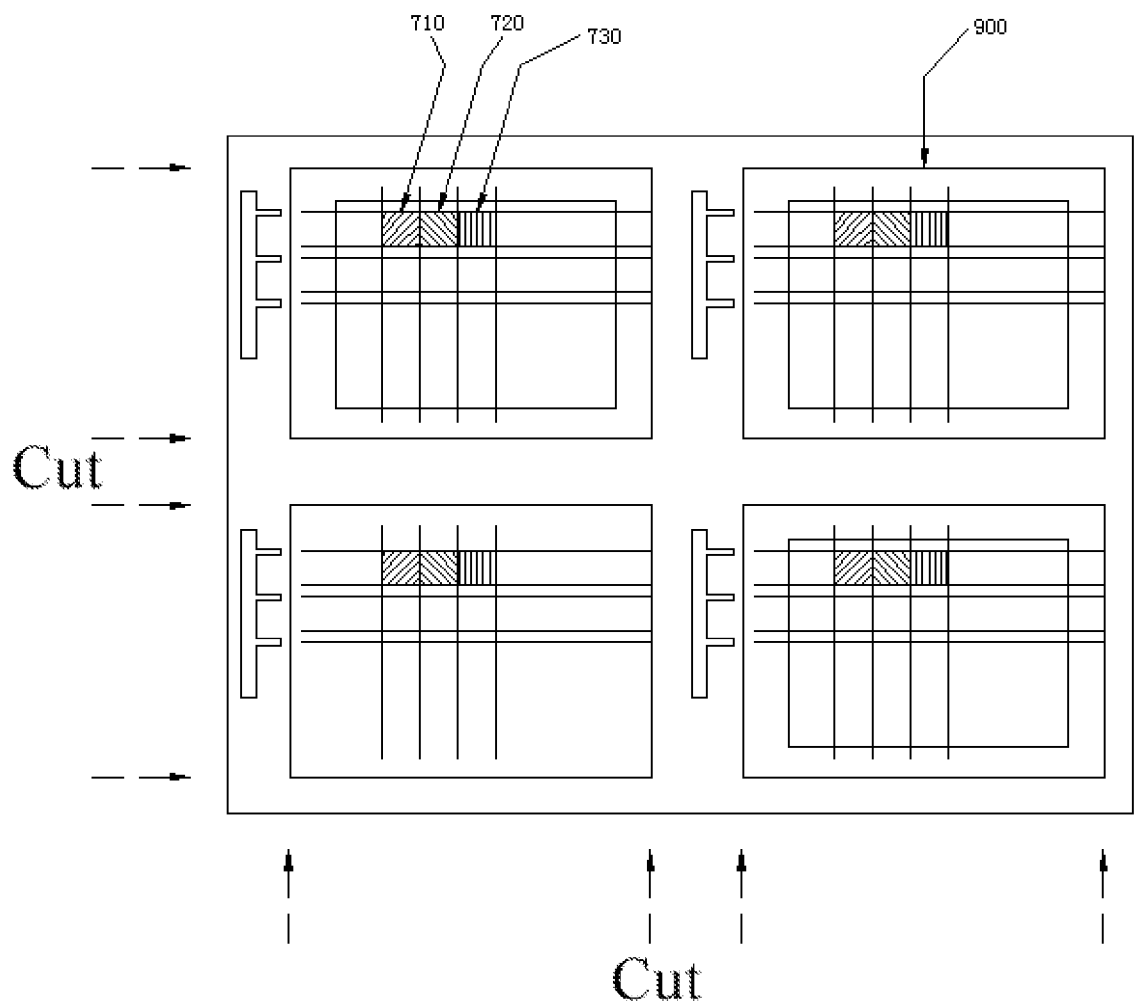
FIGS. 8 and 9 are schematic diagrams of alignment and cut of the array substrate and the opposite substrate in a method of manufacturing the display panel provided by the embodiment of the present application.
Figure 9:
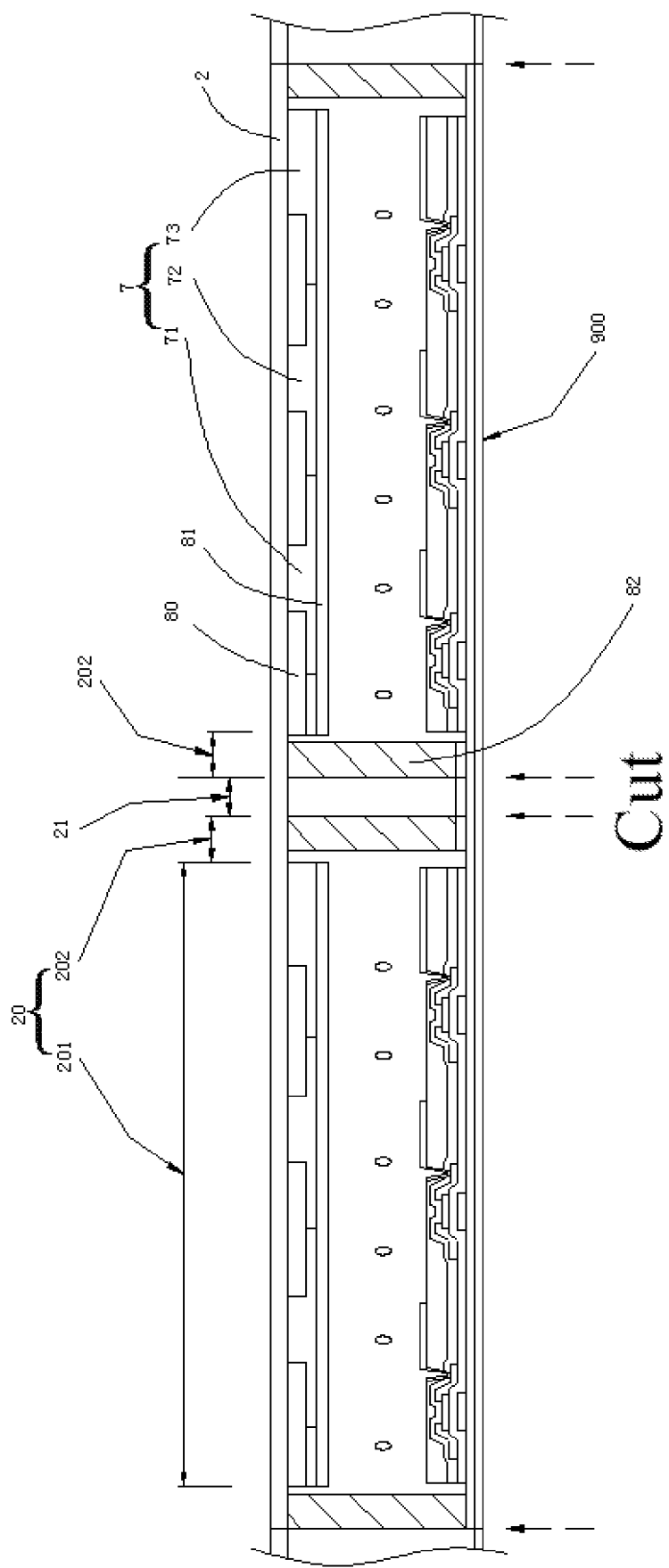

As shown in FIGS. 8 and 9, a method of manufacturing the display panel of the present application further comprises a step to manufacture a second substrate 200 opposite to the array substrate 100 and a step to align and cut the array substrate 100 and the second substrate 200.

In an embodiment, the second substrate 200 is a color film substrate comprising a color resistance layer 7, and the steps of the color film substrate may comprise: a second base substrate 2 is provided, the second base substrate 2 comprising a plurality of second active areas 20 arranged at intervals, and a second cutting area 21 arranged around the second active area 20. The second cutting area 21 is corresponding to the first cutting area 11 and is also cut and removed after the subsequent alignment of the first base substrate 1 and the second base substrate 2. The second active area 20 comprises a second display area 201 and a second peripheral wiring area 202 provided on the periphery of the second display area 201; the second active area 20 is corresponding to the first active area 10, and the second cutting area 21 is corresponding to the first cutting area 11. A black matrix layer 80, a color resistance layer 7 and a common electrode layer 81 are formed in the second active area 20. An alignment layer is formed on the common electrode layer 81. The second peripheral wiring area 202 is corresponding to the first peripheral wiring area 201, and is used to form wiring to provide signals to the common electrode layer 81, and to provide space for packaging or support structure, etc., between the first base substrate 1 and the second base substrate 2.

The color resistance layer 7 comprises a plurality of red color resistance blocks 71, green color resistance blocks 72 and blue color resistance blocks 73 arranged at intervals, respectively corresponding to a plurality of sub-pixels on the array substrate 100.

The step to form the color resistance layer 7 comprises: a red color resistance layer is deposited on the black matrix layer 80 and the first base substrate 1 in the second active area 20 and patterned to obtain a red color resistance block 71 which is corresponding to a pixel electrode 6 on the array substrate 100; a green color resistance layer is deposited on the red color resistance block 71 and the black matrix layer 80 and patterned to obtain a green color resistance block 72 which is corresponding to a pixel electrode 6 on the array substrate 100; a blue color resistance layer is deposited on the red color resistance block 71, the green color resistance block 72 and the black matrix layer 80 and patterned to obtain a blue color resistance block 73 which is corresponding to a pixel electrode 6 on the array substrate 100.

Then, the array substrate 100 and the second substrate 200, i.e., the color film substrate are aligned and cut, and comprise: liquid crystal is dropped into the first display area 101 on the first base substrate 1 and frame glue is coated onto the first peripheral wiring area 102, the first base substrate 1 and the second base substrate 2 are aligned together and then subjected to UV irradiation curing treatment, and the first base substrate 1 and the second base substrate 2 are cut along the outer edge of the first peripheral wiring area 102 and the second peripheral wiring area 202 to obtain a plurality of display panels 900, as shown in FIGS. 8 and 9.

In an embodiment, manufacturing the second substrate 200 comprises: a second base substrate 2 is provided, the second base substrate 2 comprising a plurality of second active areas 20 arranged at intervals, and a second cutting area 21 arranged around the second active area 20. The second active area 20 comprises a second display area 201 and a second peripheral wiring area 202 provided on the periphery of the second display area 201; the second active area 20 is corresponding to the first active area 10, and the second cutting area 21 is corresponding to the first cutting area 11. A common electrode layer 81 is formed in the second active area 20, and an alignment layer is formed on the common electrode layer 81, which is not shown in the figure.

Then, the array substrate 100 and the second substrate 200 are aligned and cut to obtain a plurality of display panels 900 comprising the COA type array substrate 100.

Figure 10:
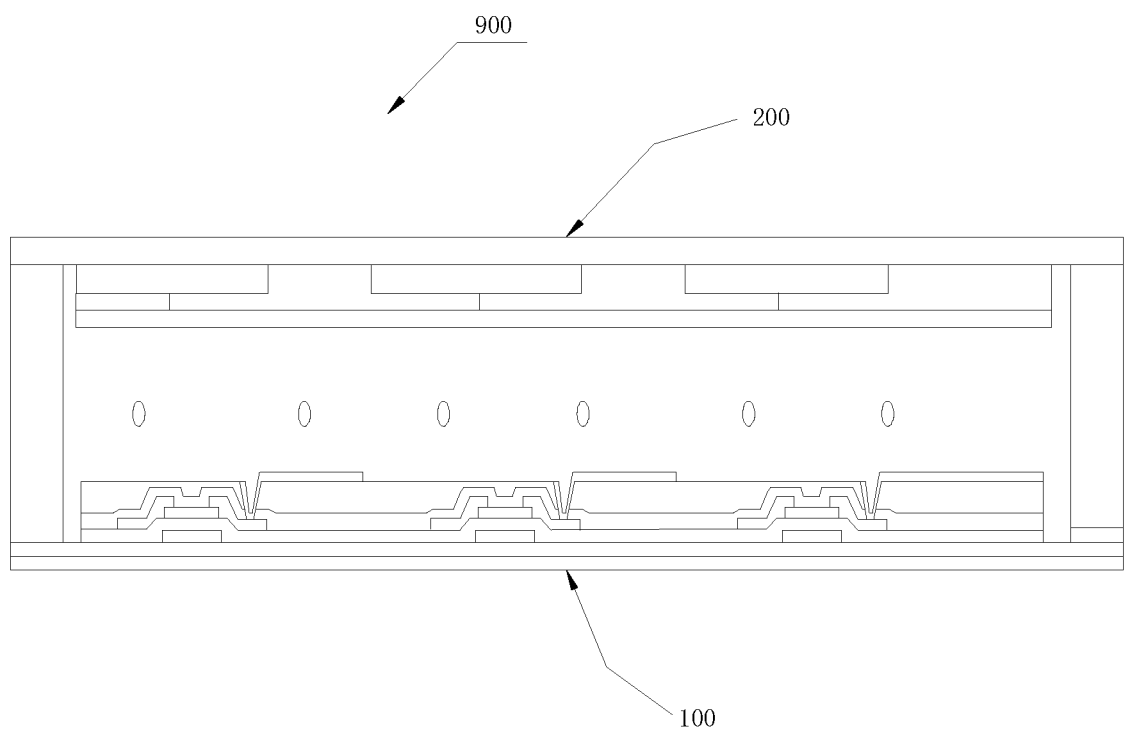
FIG. 10 is a structural schematic diagram of the display panel provided by an embodiment of the present application.

The present application also provides a display panel 900, which is manufactured by the above-mentioned method of manufacturing the display panel, as shown in FIG. 10.

In an embodiment, the display panel 900 comprises an array substrate 100 and a second substrate 200, and the second substrate 200 may be a color film substrate comprising a color resistance layer. The array substrate comprises a plurality of scanning lines, a plurality of data lines, and a plurality of sub-pixels, and each row of sub-pixels is driven by two adjacent scanning lines, and two adjacent columns of sub-pixels are simultaneously connected to one data line, which becomes an HSD design. In the manufacturing process of the display panel 900, since a scanning line 31 is connected to the spaced scanning lines 31 through a shorting bar 32, when a signal is applied to both sides of each of the scanning lines 31, even if the distance between the scanning line 31 and the adjacent scanning line 31 is too small, no capacitance effect will be formed, and will not interfere with signal detection. If the scanning line 31 has an open-circuit defect, the abnormality of the signal can be detected, so that the open-circuit defect of the scanning line 31 can be detected accurately, which improves the detection yield and manufacturing yield of the display panel to guarantee the yield of display panel 900.

The present application also provides a display device (not shown), which comprises the aforementioned display panel 900 and a backlight module provided on one side of the display panel 900.

The present application also provides a method of detecting a display panel used to detect open-circuit defect and short-circuit defect of scanning lines of an array substrate, the method comprising electrically connecting a plurality of even-numbered scanning lines to make the odd-numbered scanning lines each in short-circuit with at least another odd-numbered scanning line; or connecting a plurality of odd-numbered scanning lines to make the even-numbered scanning lines each in short-circuit with at least another even-numbered scanning line; performing an open-circuit detection on each of the scanning lines; disconnecting the electrical connection between a plurality of even-numbered scanning lines or the electrical connection between a plurality of odd-numbered scanning lines, and performing a short-circuit detection on each of the scanning lines.

In one embodiment, a plurality of even-numbered scanning lines or a plurality of odd-numbered scanning lines are electrically connected by shorting bars that are arranged on the same layer and formed simultaneously with the scanning lines, that is, scanning lines and shorting bars are formed simultaneously by a photolithography process. The shorting bars are connected to a plurality of odd-numbered scanning lines and even-numbered scanning lines to avoid capacitive effects formed between two adjacent scanning lines. After the open-circuit detection is completed, the electrical connection between the shorting bar and the scanning line is cut by a laser cutting method, and the shorting bar and the area where it is located are cut off after the manufacture of a plurality of display panels is completed.

The method of detecting the display panel provided by the embodiment of the present application is implemented in step c of the method of manufacturing the above-mentioned display panel. The manufacturing and characteristics of the shorting bar has described in the description of the above-mentioned embodiment, and for the sake of simplification, we do not describe it again.

The above are only optional embodiments of the application, and are not used to limit the application. For those skilled in the art, this application can have various modifications and changes. Any modification, equivalent replacement, improvement, etc. made within the spirit and principle of this application shall be comprised in the scope of the claims of this application.

What is claimed is:

1. A method of manufacturing a display panel having a half source double gate design, comprising manufacturing a first substrate, wherein manufacturing the first substrate comprises:

providing a first base substrate, wherein the first base substrate comprises a plurality of first active areas arranged at intervals and a first cutting area arranged around the first active area, and wherein the first active area comprises a first display area and a first peripheral wiring area provided on a periphery of the first display area;

forming a plurality of scanning lines arranged at intervals and a plurality of shorting bars on the first base substrate, wherein the scanning lines are located in the first display area and extend to the first peripheral wiring area, wherein either:

the shorting bars are located in the first cutting area and are respectively connected to one end of odd-numbered scanning lines to make the odd-numbered scanning lines each in an electrical connection with at least another odd-numbered scanning line; or the shorting bars are respectively connected to one end of even-numbered scanning lines to make the even-numbered scanning lines each in an electrical connection with at least another even-numbered scanning line;

performing an open-circuit detection on the scanning lines not connected to the shorting bar by way of non-contact detection, wherein an alternating current voltage is applied at a position above one end of the scanning lines not connected to the shorting bar, and a detection signal is detected by a receiving sensor at the other end of the scanning lines not connected to the shorting bar;

cutting off the area between the shorting bars and the scanning lines, and performing short-circuit detection on the scanning lines;

forming an insulating layer and a second metal layer on the scanning lines, wherein the second metal layer comprises a plurality of data lines arranged at intervals; and performing short-circuit detection and open-circuit detection on the data lines.

2. The method of manufacturing a display panel according to claim 1, wherein the shorting bar is cut off from the scanning lines along a place between the first peripheral wiring area and the first cutting area.

3. The method of manufacturing a display panel according to claim 1, wherein the shorting bar comprises a shorting part and a plurality of connection parts connected between the shorting part and the scanning lines, wherein either:
one of the connection parts is correspondingly connected to one of the odd-numbered scanning lines; or
one of the connection parts is correspondingly connected to one of the even-numbered scanning lines.

4. The method of manufacturing a display panel according to claim 3, wherein the connection parts extend in parallel along the scanning lines, and wherein the shorting part is perpendicular to the connection parts and the scanning lines.

5. The method of manufacturing a display panel according to claim 3, wherein the connection parts are connected obliquely to the scanning lines.

6. The method of manufacturing a display panel according to claim 3, wherein each of the first active areas is corresponding to one shorting part, and wherein either:
the shorting part is connected to all the even-numbered scanning lines located in the first active area; or
the shorting part is connected to all the odd-numbered scanning lines located in the first active area.

7. The method of manufacturing a display panel according to claim 3, wherein each of the first active areas is corresponding to a plurality of the shorting parts, and wherein either:
each of the shorting parts is connected to a plurality of even-numbered scanning lines; or
each of the shorting parts is connected to a plurality of odd-numbered scanning lines.

8. The method of manufacturing a display panel according to claim 5, wherein either:
the shorting part connects a plurality of odd-numbered scanning lines in an odd order; or
the shorting part connects a plurality of even-numbered scanning lines in an even order.

9. The method of manufacturing a display panel according to claim 1, wherein manufacturing the first substrate further comprises:
forming a passivation layer on the second metal layer in the first active area; and
forming a transparent conductive layer on the passivation layer, and patterning the transparent conductive layer to obtain a plurality of pixel electrodes.

10. The method of manufacturing a display panel according to claim 1, wherein manufacturing the first substrate further comprises: forming a passivation layer on the second metal layer in the first active area;
forming a color resistance layer on the passivation layer;
forming a flat layer on the color resistance layer;
forming a transparent conductive layer on the flat layer; and
patterning the transparent conductive layer to obtain a plurality of pixel electrodes.

11. The method of manufacturing a display panel according to claim 10, further comprising manufacturing a second substrate opposite to the first substrate, wherein manufacturing the second substrate opposite to the first substrate comprises:
providing a second base substrate, wherein the second base substrate comprises a plurality of second active areas arranged at intervals and a second cutting area arranged around the second active area, wherein the second active area comprises a second display area and a second peripheral wiring area provided on the periphery of the second display area, and wherein the second active area is corresponding to the first active area and the second cutting area is corresponding to the first cutting area; and
forming a common electrode layer in the second active area.

12. The method of manufacturing a display panel according to claim 9, further comprising manufacturing a second substrate opposite to the first substrate, wherein manufacturing the second substrate opposite to the first substrate comprises:
providing a second base substrate, wherein the second base substrate comprises a plurality of second active areas arranged at intervals and a second cutting area arranged around the second active area, wherein the second active area comprises a second display area and a second peripheral wiring area provided on the periphery of the second display area, wherein the second active area is corresponding to the first active area, and wherein the second cutting area corresponds to the first cutting area;
forming a black matrix layer in the second active area of the second base substrate;
forming a color resistance layer on the black matrix layer; and
forming a common electrode layer on the color resistance layer.

13. The method of manufacturing a display panel according to claim 11, further comprising aligning and cutting the first substrate and the second substrate, wherein aligning and cutting the first substrate and the second substrate comprises:
aligning and then performing curing treatment on the first base substrate and the second base substrate; and
cutting the first base substrate and the second base substrate along an outer edge of the first peripheral wiring area and the second peripheral wiring area to obtain a plurality of display panels.

14. The method of manufacturing a display panel according to claim 12, further comprising aligning and cutting the first substrate and the second substrate, wherein aligning and cutting the first substrate and the second substrate comprises:
aligning the first base substrate and the second base substrate and then performing a curing treatment; and
cutting the first base substrate and the second base substrate along an outer edge of the first peripheral wiring area and the second peripheral wiring area to obtain a plurality of display panels.

15. A method of manufacturing a display panel having a half source double gate design, comprising manufacturing a first substrate, wherein manufacturing the first substrate comprises:
providing a first base substrate, wherein the first base substrate comprises a plurality of first active areas arranged at intervals and a first cutting area arranged around the first active area, and wherein the first active area comprises a first display area and a first peripheral wiring area provided on a periphery of the first display area;

depositing a first metal material layer on the first base substrate;

patterning the first metal material layer and meanwhile forming a plurality of parallel and spaced scanning lines and a shorting bar through a photo masking process, wherein the scanning lines are located in the first display area and extend to the first peripheral wiring area, wherein the shorting bar is located in the first cutting area, wherein the shorting bar is connected to one end of a plurality of odd-numbered scanning lines or alternatively the shorting bar is connected to one end of a plurality of even-numbered scanning lines, and wherein a thickness of the first metal material layer is 2000-5500 angstroms;

performing an open-circuit detection on the scanning lines not connected to the shorting bar by way of non-contact detection, wherein an alternating current voltage is applied at a position above one end of the scanning lines not connected to the shorting bar, and a detection signal is detected by a receiving sensor at the other end of the scanning lines not connected to the shorting bar;

cutting off the area between the shorting bars and the scanning lines;

performing a short-circuit detection on each of the scanning lines;

forming an insulating layer on the scanning line;

depositing a second metal material layer on the insulating layer;

patterning the second metal material layer to form a plurality of parallel and spaced data lines; and performing an open-circuit detection and a short-circuit detection on the data lines.

* * * * *